US010544859B2

(12) United States Patent
Fribus et al.

(10) Patent No.: US 10,544,859 B2
(45) Date of Patent: Jan. 28, 2020

(54) GEARSHIFT DEVICE FOR A VEHICLE TRANSMISSION AND METHOD FOR DETERMINING A SELECTOR LEVER POSITION IN A GEARSHIFT DEVICE FOR A VEHICLE TRANSMISSION

(71) Applicant: ZF Friedrichshafen AG, Friedrichshafen (DE)

(72) Inventors: Vitali Fribus, Quakenbrück (DE); Alexander Kirilenko, Diepholz (DE); Karsten Straßburg, Hannover (DE); Sascha Tränkner, Rehden (DE); Ludger Rake, Steinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 194 days.

(21) Appl. No.: 15/535,192

(22) PCT Filed: Nov. 10, 2015

(86) PCT No.: PCT/EP2015/076119
§ 371 (c)(1),
(2) Date: Jun. 12, 2017

(87) PCT Pub. No.: WO2016/091505
PCT Pub. Date: Jun. 16, 2016

(65) Prior Publication Data
US 2017/0321798 A1    Nov. 9, 2017

(30) Foreign Application Priority Data
Dec. 12, 2014    (DE) .................. 10 2014 225 665

(51) Int. Cl.
*F16H 59/04*    (2006.01)
*F16H 59/02*    (2006.01)
(Continued)

(52) U.S. Cl.
CPC ....... *F16H 59/044* (2013.01); *F16H 59/0204* (2013.01); *F16H 59/105* (2013.01);
(Continued)

(58) Field of Classification Search
CPC .. F16H 59/0204; F16H 59/044; F16H 59/105; F16H 2059/026; F16H 61/0213;
(Continued)

(56) References Cited

U.S. PATENT DOCUMENTS 4,519,266 A * 5/1985 Reinecke .............. F16H 59/044
116/DIG. 20
6,710,322 B1 * 3/2004 Baltes ................... F16H 59/105
250/214 PR
(Continued)

FOREIGN PATENT DOCUMENTS

DE        102 31 015 A1    3/2004
DE    10 2008 039 605 A1    3/2010
(Continued)

OTHER PUBLICATIONS

WO 2007128590 A1 (Bethke, Jurgen) Nov. 15, 2007 [online] [retrieved on Jun. 13, 2019]. Retrieved from: ProQuest Dialog. (Year: 2007).*
(Continued)

*Primary Examiner* — Victor L MacArthur
*Assistant Examiner* — Joseph Brown
(74) *Attorney, Agent, or Firm* — Brinks Gilson & Lione

(57) ABSTRACT

The disclosure relates to a shifting device for a vehicle transmission. The shifting device comprises a gearshift lever for selecting a transmission setting of the vehicle transmission, wherein the gearshift lever can move along at least one first shift gate and one second shift gate, a marking element mechanically coupled to the gearshift lever, having at least one first marking line dedicated to the first shift gate and one
(Continued)

second marking line dedicated to the second shift gate, a guide assembly, which is configured to guide the marking element along the first marking line to a detection position when the gearshift lever is moved along the first shift gate, and to move the marking element along the second marking line to the detection position when the gearshift lever is moved along the second shift gate, and lastly, a detection device, which is disposed at the detection position and is configured to create a movement signal representing a movement of the first marking line and/or the second marking line in relation to the detection position, in order to determine a position of the gearshift lever in the first shift gate and/or the second shift gate.

21 Claims, 4 Drawing Sheets

(51) Int. Cl.
*F16H 59/10* (2006.01)
*F16H 61/02* (2006.01)
*G05G 1/04* (2006.01)
*G01B 11/14* (2006.01)
*G01D 5/26* (2006.01)

(52) U.S. Cl.
CPC ......... *F16H 61/0213* (2013.01); *G01B 11/14* (2013.01); *G01D 5/26* (2013.01); *G05G 1/04* (2013.01); *F16H 2059/026* (2013.01)

(58) Field of Classification Search
CPC ...... G05G 1/015; G05G 1/04; G05G 9/04785; G01B 11/14; G01D 5/26
USPC .............. 74/473.18, 473.3, 473.33, 471 XY
See application file for complete search history.

(56) References Cited

U.S. PATENT DOCUMENTS

| | | | |
|---|---|---|---|
| 2002/0056334 A1* | 5/2002 | Fujinuma | F16H 59/0204 74/473.1 |
| 2004/0035237 A1 | 2/2004 | Matsui et al. | |
| 2004/0237692 A1* | 12/2004 | Syamoto | F16H 59/0204 74/473.12 |
| 2005/0028634 A1 | 2/2005 | Giefer et al. | |
| 2015/0122981 A1* | 5/2015 | Hartrampf | F16H 59/105 250/231.13 |
| 2016/0215875 A1* | 7/2016 | Grennvall | F16H 59/0204 |
| 2017/0152938 A1* | 6/2017 | Kirilenko | F16H 59/105 |

FOREIGN PATENT DOCUMENTS

| | | | | |
|---|---|---|---|---|
| DE | 10 2014 017 480 A1 | | 6/2015 | |
| EP | 3067663 A1 | * | 9/2016 | ......... F16H 59/0204 |
| JP | 2007-302070 A | | 11/2007 | |
| JP | 2008-006872 A | | 1/2008 | |
| JP | 2008137440 A | * | 6/2008 | ......... F16H 59/0204 |
| JP | 4964581 B2 | * | 7/2012 | ......... F16H 59/0204 |
| JP | 4964744 B2 | * | 7/2012 | ......... F16H 59/0204 |
| JP | 2012192784 A | * | 10/2012 | ........... F16H 59/105 |
| WO | WO 2007/128590 A1 | | 11/2007 | |
| WO | WO 2015/078970 A2 | | 6/2015 | |

OTHER PUBLICATIONS

German Office Action in priority application DE 10 2014 225 665.8 dated Sep. 29, 2015, in German language, 8 pages.
International Search Report dated Feb. 18, 2016 in International Application No. PCT/EP2015/076119, 3 pages, German Language.
International Search Report dated Feb. 18, 2016 in International Application No. PCT/EP2015/076119, 2 pages, English Language.
Written Opinion of the International Search Authority dated Jun. 16, 2016 in International Application No. PCT/EP2015/076119, 5 pages, German Language.

* cited by examiner

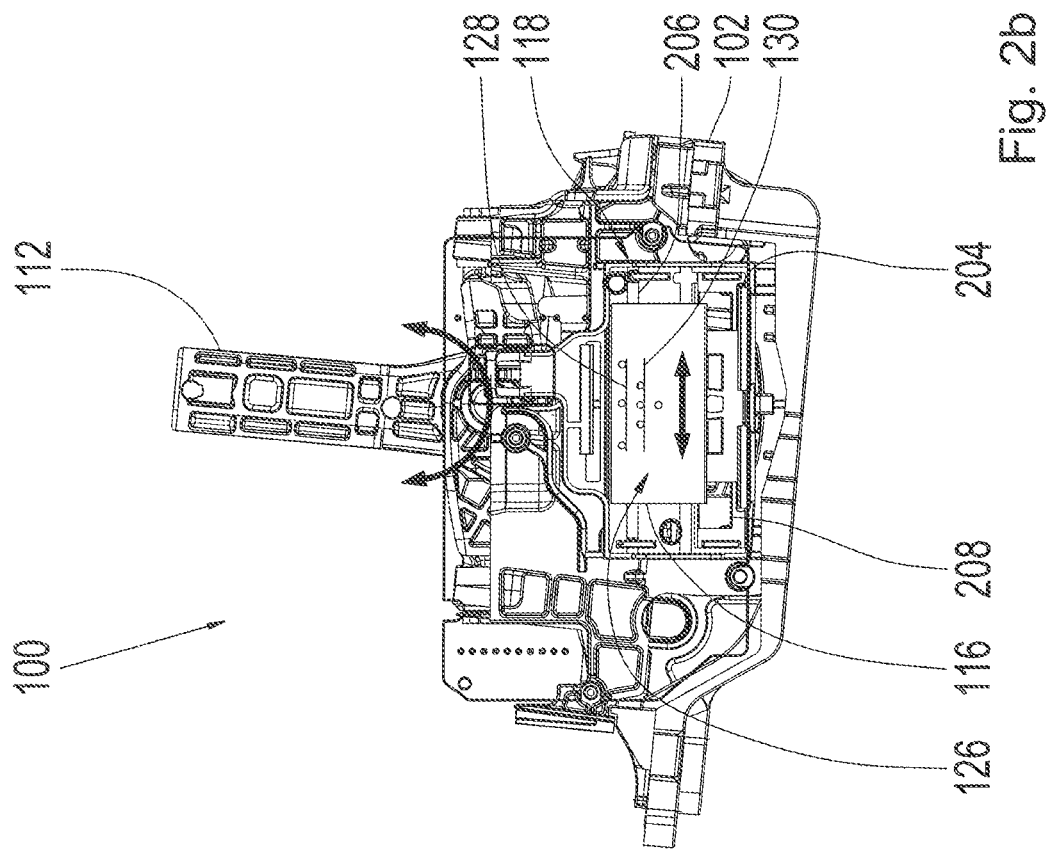
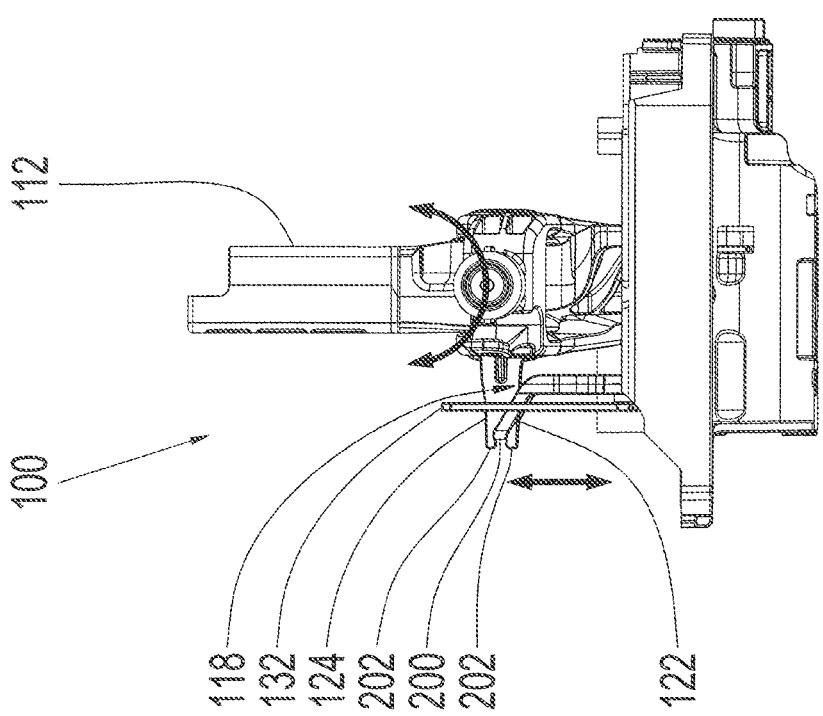

GEARSHIFT DEVICE FOR A VEHICLE TRANSMISSION AND METHOD FOR DETERMINING A SELECTOR LEVER POSITION IN A GEARSHIFT DEVICE FOR A VEHICLE TRANSMISSION

This application is a filing under 35 U.S.C. § 371 of International Patent Application PCT/EP2015/076119, filed Nov. 10, 2015, and claims the priority of DE 10 2014 225 665.8, filed Dec. 12, 2014. These applications are incorporated by reference herein in their entirety.

BACKGROUND OF THE INVENTION

The present disclosure relates to a shifting device for a vehicle transmission and a method for determining a gearshift lever position in a shifting device for a vehicle transmission.

A shifting device is known from JP 2008006872, having a camera for detecting position marks on a gearshift lever for an automatic transmission.

BRIEF SUMMARY OF THE INVENTION

Based on this, the present disclosure creates a shifting device for a vehicle transmission and a method for determining a gearshift lever position in a shifting device for a vehicle transmission according to the independent Claims. Advantageous designs can be derived from the dependent Claims and the following description.

The approach presented herein creates a shifting device for a vehicle transmission, wherein the shifting device has the following features:

a gearshift lever for selecting a transmission setting of the vehicle transmission, wherein the gearshift lever can move along at least one first shift gate and one second shift gate;

a marking element mechanically coupled to the gearshift lever, having at least one first marking line dedicated to the first shift gate and one second marking line dedicated to the second shift gate;

a guide assembly, which is designed to guide the marking element along the first marking line to a detection position when the gearshift lever is moved along the first shift gate, and guide it along the second marking line to the detection position when the gearshift lever is moved along the second shift gate; and a detection device, which is disposed at the detection position, and is designed to issue a movement signal, representing a movement of the first marking line and/or the second marking line in relation to the detection position, for determining a position of the gearshift lever in the first shift gate and/or the second shift gate.

A vehicle transmission can be understood to be an automatic transmission, for example. A gearshift lever can be understood to be a rod or stick shaped element for actuating the shifting device. By way of example, the gearshift lever can be disposed in the shifting device such that it can be tilted or pivoted. A shift gate can be understood to be a movement axis of the gearshift lever. By way of example, the shifting device can have a toothing, which serves to move the gearshift lever into predetermined positions in the shift gates.

A marking element can be understood to be an element having a flat or slightly curved marking surface, to which the two marking lines can be applied. A marking line can be understood to be a line or strip shaped marking region. By way of example, the marking lines can be formed by a sequence of different individual markings.

A guide assembly can be understood to be a device for guiding a movement of the marking element. The guide assembly can be designed, for example, as a plate or frame shaped element having at least one elongated hole or profile functioning as a guide track, wherein the marking element can have at least one guide body that can be guided in the elongated hole, or a counter-profile that can be slid along the profile.

A detection position can be understood to be a position at which the detection device and the marking device are disposed opposite one another in order to enable a detection of the marking lines by the detection device. The detection position can be defined, for example, by an installation position of the detection device. The detection device can be implemented as an optical sensor, for example. In particular, the detection device can be a sensor system from a computer mouse.

The approach proposed herein is based on the recognition that positions of a gearshift lever in a shifting device can be detected using only a single sensor, in that different marking lines are guided to the sensor, depending on the position of the gearshift lever. The production costs of the shifting device can be reduced by a sensor system simplified in this manner.

The shifting device can have an evaluation device, which is designed to determine a speed of the movement of the first marking line based on the movement signal, to determine a distance traveled on the first marking line as a function of the speed, and to determine the position of the gearshift lever in the first shift gate as a function of the distance. Additionally or alternatively, the evaluation device can be designed to determine a speed of the movement of the second marking line based on the movement signal, to determine a distance traveled on the second marking line as a function of the speed, and to determine the position of the gearshift lever in the second shift gate as a function of the distance. The movement signal can comprise an image datum, for example, which represents a section of the respective marking line guided to the detection position in a specific time, which is basically a series of marks on the marking line. The speed with which the marking lines are guided to the detection position can be determined on the basis of the image data, and a distance that has been traveled by the marking line can be determined thereby as a function of the speed. With an evaluation of the movement signal in this manner, a movement direction of the gearshift lever can already be determined during the movement of the gearshift lever.

It is furthermore advantageous when the first marking line has numerous different markings for marking predetermined positions of the gearshift lever in the first shift gate. Additionally or alternatively, the second marking lines can have numerous different markings for marking predetermined positions of the gearshift lever in the second shift gate. Depending on the embodiment, the detection device can be designed to issue the movement signal using the markings on the first marking line or the markings on the second marking line. A marking can be a geometrical shape, such as a square, a rectangle, or a circle. For a clear distinction, the geometric forms can be oriented in different directions, or have different contrasts. Each marking can be dedicated to exactly one predetermined position of the gearshift lever. Additionally, the markings of the first marking line can differ from the markings of the second marking line. The markings enable the use of an optical sensor as the detection device.

According to another embodiment, the first marking line can have numerous spacing lines of different lengths for marking a respective spacing between the markings on the first marking line. Additionally or alternatively, the second marking line can have numerous spacing lines of different lengths for marking a respective spacing between the markings on the second marking line. Depending on the embodiment, the detection device can be designed to also issue the movement signal based on the spacing lines on the first marking line or based the spacing lines on the second marking line. By way of example, the spacing lines can be disposed such that they are transverse to a respective main direction of extension of the marking lines. The spacing lines enable a precise detection of the movements of the gearshift lever between two markings.

It is also advantageous when the first marking line has a first middle position marking for marking a middle position of the gearshift lever in the first shift gate, and additionally or alternatively, the second marking line has a second middle position marking for marking the middle position of the gearshift lever in the second shift gate. A respective length of the spacing lines on the first marking line can represent a respective spacing of the spacing line to the first middle position marking, and a respective length of the spacing line on the second marking line can represent a respective spacing of the spacing line to the second middle position marking. A middle position can be understood, for example, to be a neutral or starting position of the gearshift lever. The middle position markings can be designed the same or similar to the other markings. By way of example, the lengths of the spacing lines of a respective marking line can increase from one spacing line to the next, starting from a respective middle position marking. As a result, it is possible to quickly and precisely calibrate or reorient the detection device.

According to another embodiment, the gearshift lever can be disposed such that it can move along a changing gate for changing between the first shift gate and the second shift gate. The marking element can have a third marking line dedicated to the changing gate. Accordingly, the guide assembly can be designed to guide the marking element along the third marking line to the detection position when the gearshift lever is moved along the changing gate. The detection device can be designed to issue a movement signal for determining a position of the gearshift lever in the changing gate representing a movement of the third marking line in relation to the detection position. A changing gate can be understood to be a movement axis of the gearshift lever deviating from the two shift gates. By way of example, the changing gate can be oriented basically perpendicular to the first shift gate, the second shift gate, or both shift gates. The gearshift lever can basically be moved between the middle position in the first shift gate and the middle position in the second shift gate by means of the changing gate. The third marking line can have numerous spacing lines of different lengths for marking a spacing between the first and second middle position marks, in the same manner as first and second marking lines. With this embodiment, it is possible to detect positions and movements of the gearshift lever between the first and second shift gates.

Depending on the embodiment, the third marking line can be substantially perpendicular to the first marking line, the second marking line, or both marking lines. Analogous to the two shift gates, the first marking line and the second marking line can be disposed such that they are substantially parallel to one another, for example. The third marking line, analogous to the changing gate, can be disposed substantially perpendicular to the first and second marking lines. An accordingly simply constructed guide assembly for guiding the marking elements can be used as a result of an orthogonal alignment of the marking lines.

The shift device can also be provided with a housing base part, a housing insert disposed in the housing base part, and a crosspiece. The crosspiece can be disposed in the housing insert such that it can pivot, in order to move the gearshift lever between the first shift gate and the second shift gate. The gearshift lever can be disposed in the crosspiece such that it can pivot, in order to be moved along the first shift gate or the second shift gate. Furthermore, the crosspiece can be mechanically coupled to the guide assembly, in order to change a position of the guide assembly in relation to the detection position when the gearshift lever is moved between the first shift gate and the second shift gate. With such a modular construction, the shifting device can be installed or removed with little effort.

A main plane of extension of the marking element can be disposed substantially parallel to a longitudinal axis of the gearshift lever. In this manner, the space requirements of the shifting device can be reduced.

The approach described herein also creates a method for determining a gearshift lever position in a shifting device for a vehicle transmission, wherein the shifting device has a gearshift lever for selecting a transmission setting of the vehicle transmission, a marking element mechanically coupled to the gearshift lever, a guide assembly, and a detection device disposed at a detection position, wherein the gearshift lever can move along at least one first shift gate and one second shift gate, and the marking element has at least one first marking line dedicated to the first shift gate and one second marking line dedicated to the second shift gate, wherein the method comprises the following steps;

guiding the marking element to the detection position by means of the guide assembly, wherein the marking element is guided along the first marking line when the gearshift lever is moved along the first shift gate, and along the second marking line when the gearshift lever is moved along the second shift gate; and creating a movement signal representing a movement of the first marking line and/or the second marking line in relation to the detection position by means of the detection device, in order to determine a position of the gearshift lever in the first shift gate and/or the second shift gate.

Lastly, the approach proposed herein provides for the use of a computer mouse sensor system as a detection device in a shifting device according to one of the embodiments described herein. A computer mouse sensor system can be understood to be an optical sensor system, such as that used in laser mice or optical mice. The production costs of the shifting device can be significantly reduced through the use of sensor systems of this type, which are available in large quantities, and are accordingly inexpensive.

BRIEF DESCRIPTION OF THE SEVERAL VIEWS OF THE DRAWINGS

The disclosure shall be explained in greater detail based on the attached drawings.
Therein:
FIGS. 2a, 2b show schematic illustrations of a shifting device according to an exemplary embodiment of the present disclosure;

DETAILED DESCRIPTION OF THE INVENTION

In the following description of preferred exemplary embodiments of the present disclosure, the same or similar reference symbols are used for the elements depicted in the various figures having similar functions, wherein there shall be no repetition of the description of these elements.

Figure 1:
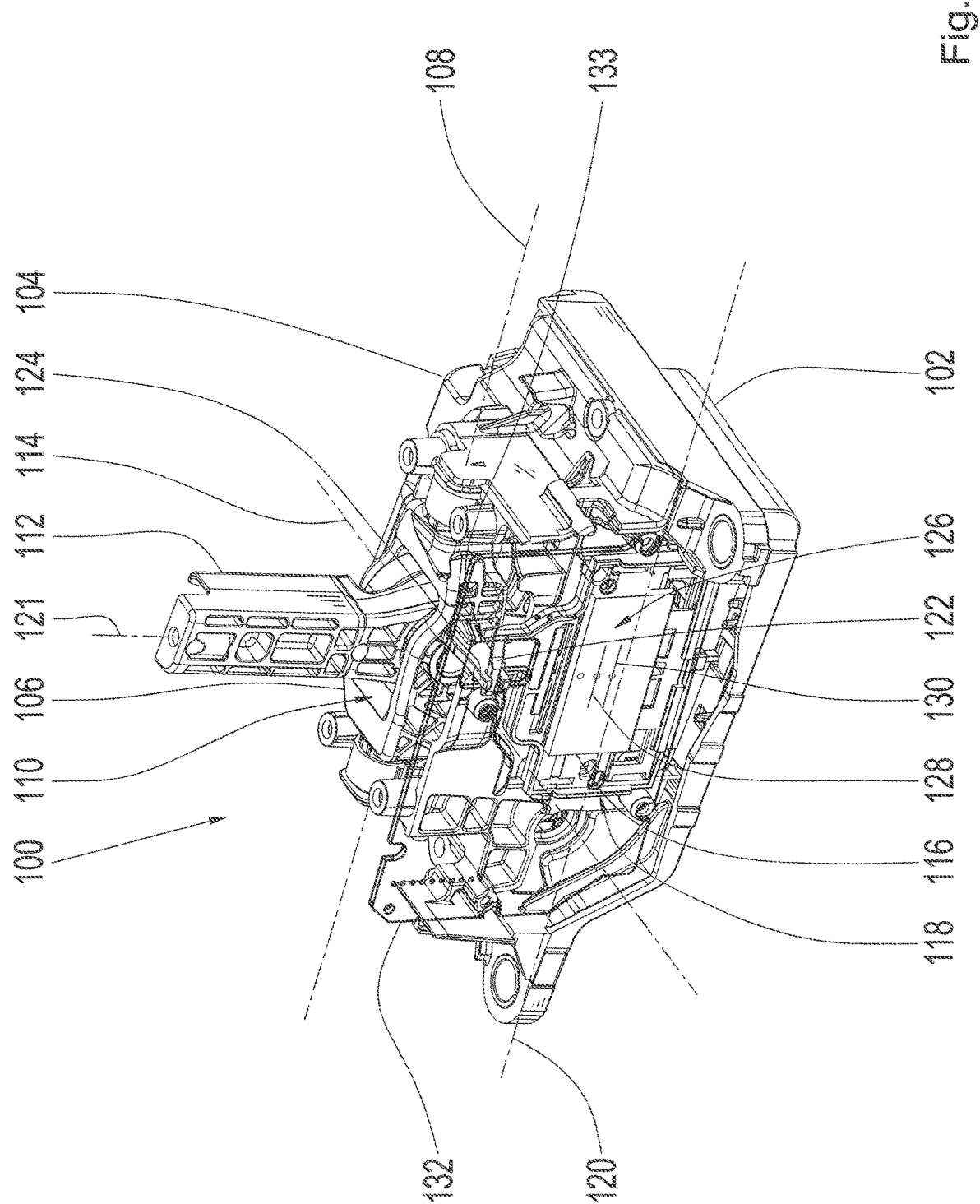
FIG. 1 shows a schematic illustration of a shifting device according to an exemplary embodiment of the present disclosure.

FIG. 1 shows a schematic illustration of a shifting device 100 according to an exemplary embodiment of the present disclosure.

According to this exemplary embodiment, the shifting device 100 for a vehicle transmission has a housing base part 102 and a frame-like housing insert 104 securely connected to the housing base part 102. The housing base part 102 serves, for example, to attach the shifting device 100 to a vehicle body. A crosspiece 106 is supported in the housing insert 104 such that it can rotate about a crosspiece axis 108. The crosspiece 106 has a central crosspiece clearance 110, through which a gearshift lever 112 for selecting a transmission setting of the vehicle transmission is guided. The gearshift lever 112 is supported in the crosspiece clearance 110 such that it can rotate about a gearshift lever axis 114. By way of example, in FIG. 1 the crosspiece axis 108 and the gearshift lever axis 114 are substantially perpendicular to one another.

By tilting it over the crosspiece axis 114, the gearshift lever 112 can be moved between various shift gates, as shall be described in greater detail below. Through tilting it over the gearshift lever axis 108, the gearshift lever 112 can be moved between shifting points in a respective shift gate, predetermined by a toothing.

The gearshift lever 112 is mechanically coupled to a carriage serving as the marking element 116. The marking element 116 has a substantially rectangular shape, and is disposed such that it can be slid along a sliding axis 120 in a frame-like guide assembly 118. By way of example, the sliding axis 120 faces in the same direction as the crosspiece axis 114. The guide assembly 118 is attached to an outer surface of the housing insert 104. The marking element 116 is disposed in the guide assembly 118 thereby, such that a main plane of extension of the marking element 116 is oriented substantially parallel to a longitudinal axis 121 of the gearshift lever 112. The guide assembly 118 has a retention element 122, in which an arm 124 formed on the crosspiece 106 engages. The arm 124 serves to raise or lower the guide assembly 118 and thus the marking element 116 when the gearshift lever 112 is moved about the crosspiece axis 114 transverse to the sliding axis 120, as is shown in detail in FIG. 2a.

A first marking line 128 and a second marking line 130 are applied to a marking surface 126 of the marking element 116 facing away from the guide assembly 118, by way of example, which are depicted here schematically as lines, and extend substantially parallel to the sliding axis 120. By way of example, the first marking line 128 serves to mark shifting points in a first shift gate, and the second marking line 130 serves to mark shifting points in a second shift gate of the shifting device 100. Depending on the number of shift gates of the shifting device 100, the marking element 116 can also have more than two marking lines 128, 130.

A printed circuit board 132 is disposed opposite the marking surface 126, which supports a sensor electronics assembly for detecting the marking lines 128, 130. The marking element 116 thus functions as a sensor surface for the sensor electronics assembly. According to one exemplary embodiment, the sensor electronics assembly is the sensor system of a computer mouse, as shall be described in greater detail below. The printed circuit board 132 is implemented having a cut-out, through which the arm 124 and the retention element 122 pass. By way of example, the arm can thus be longer than a spacing between the crosspiece 106 and the printed circuit board 132.

As has been specified above, the marking element 116 is raised or lowered when the gearshift lever 112 is moved about the crosspiece axis 114 transverse to the sliding axis 120. The marking element 116 is slid thereby, depending on the direction of movement, such that either the first marking line 128 or the second marking line 130 is located in a detection range of the sensor electronics assembly. By way of example, the first marking line 128 is located in the detection range when the gearshift lever 112 is positioned in the first shift gate, and the second marking line 130 is located in the detection range when the gearshift lever 112 is positioned in the second shift gate.

When the gearshift lever 112 is moved about the gearshift axis 108, i.e. along one of the two shift gates, the marking element 116 is slid parallel to the sliding axis 120. Accordingly, the first marking line 128 is guided to the detection range when the gearshift lever 112 is moved along the first shift gate, and the second marking line 130 is guided to the detection range when the gearshift lever 112 is moved along the second shift gate.

The sensor electronics assembly is designed to detect the movements of the marking lines 128, 130 corresponding to a respective shifting movement of the gearshift lever 112 in relation to the detection range. A precise position of the gearshift lever 112 in the shift gates can then be determined through a corresponding evaluation of the movements detected by the sensor electronics assembly.

Depending on the embodiment, the housing base part 102, the housing insert 104, the gearshift lever 112, the crosspiece 106, the marking element 116 or the guide assembly 118 can be produced in an injection molding process, in order to reduce weight and production costs.

According to one exemplary embodiment, a shifting device 100 having the construction shown in FIG. 1 comprises a sensor system of an optical mouse for detecting the shifting position in an automatic transmission. The gearshift lever 112, also referred to as a shift lever, can be moved thereby between defined gearshift lever positions with the aid of a toothing and a housing that encompasses the crosspiece 106.

If the gearshift lever 112 is moved in a shift gate, the marking surface 126, which runs in a guide 118, is also moved in a direction therewith in relation to the movement of the gearshift lever 112. If the gearshift lever is moved back and forth between the gates, the height of the guide 118 changes, as can be seen in FIG. 2a. By way of example, the marking surface 126 can be moved in two dimensions between two rows, and a total of eight positions, corresponding to the gearshift lever positions shown in FIG. 4.

For a gearshift lever position detection by means of the sensor system of the optical mouse, the marking surface 126 can be marked with clear symbols, by either printing or stamping. The system can be calibrated and the sensor system can be reoriented according to an undervoltage with the aid of such markings.

If the gearshift lever 112, and thus the marking surface 126, are moved, then the permanently installed sensor system of the optical mouse lying opposite the marking surface 126 records images of the marking surface 126. The sensor system evaluates a movement of the marking surface 126 on the basis of the recorded images. If the voltage is interrupted temporarily, the position of the marking surface 126 can be clearly determined on the basis of the direction of movement and the markings.

In order to protect against dirt, the shifting device can have a cleaning device, which is designed to dust off the marking surface 126 at least in the detection range by means of a soft material, immediately prior to and following an image recording.

The FIGS. 2a and 2b show schematic illustrations of a shifting device 100 according to an exemplary embodiment of the present disclosure. The shifting device 100 corresponds to the shifting device described on the basis of FIG. 1. FIG. 2a shows a rear view of the shifting device 100, from which it is visible that the printed circuit board 132 and the guide assembly 118 are disposed substantially parallel to one another. The arm 124 and the guide assembly 118 are disposed above one another. An outer edge of the guide assembly 118 running below the arm 124 has a projection that is bent diagonally downward toward the printed circuit board 132, which is guided through the cut-out in the printed circuit board 132 and functions as a retention element 122.

The arm 124 and the retention element 122 are connected to one another such that they can move, via a form fitting connection. For this, an end of the retention element 122 protruding outward over the printed circuit board 132 is shaped in the form of a mounting bracket 200. A free end of the arm 124 has two fingers 202, which encompass the mounting bracket 200 in a form fitting manner.

By way of example, the arm 124 is basically disposed at the height of an intersection of the crosspiece axis and the gearshift lever axis. Depending on the embodiment, a longitudinal axis of the arm 124 can be oriented substantially parallel or at a diagonal to the gearshift lever axis. By way of example, the longitudinal axis of the arm 124 is substantially perpendicular to a main plane of extension of the guide assembly 118 when the gearshift lever 112 is in a middle position, shown in FIG. 2a.

As has already been explained on the basis of FIG. 1, the arm 124 is either raised or lowered when the gearshift lever 112 is moved about the crosspiece axis, depending on the direction of movement. Accordingly, the height of the guide assembly 118 changes in relation to the printed circuit board 132, and thus to the sensor electronics assembly located thereon. The movement directions of the gearshift lever 112 and the guide assembly 118 are each marked with arrows.

In FIG. 2b, the shifting device 100 is rotated 90 degrees in relation to FIG. 2a, such that the guide assembly 118 and the marking element 116 guided in a sliding manner therein are shown in a frontal view. Possible movement directions of the marking element 116 along the sliding axis and the gearshift lever 112 about the gearshift lever axis are marked with arrows.

According to this exemplary embodiment, the guide assembly 118 is designed having a u-shaped profile as the first guide track 204 and a groove as the second guide track 206. The guide tracks 204, 206 each run parallel to the sliding axis. The guide track 204 extends thereby along an outer edge of the guide assembly 118 facing the housing base part 102. The second guide track 206 is disposed at a spacing to the first guide track 204.

The marking element 116 has a wider rectangular region and a narrower rectangular region. The wider region comprises the marking surface 126 with the two marking lines 128, 130, and is guided in the second guide track 206 in a sliding manner by means of an appropriately shaped guide body, which is disposed on a side of the marking element 116 lying opposite the marking surface 126. The narrower region faces toward the housing base part 102. An outer edge of the narrower region facing the housing base part 102 is guided in a sliding manner in the first guide track 204.

The narrower region is shaped having a pin that is not visible in FIG. 2b, which is inserted through an elongated hole 208 in the marking element 116 located between the guide tracks 204, 206, and thus faces toward the gearshift lever 112. By way of example, the pin is mechanically coupled to the gearshift lever 112 via at least one joint.

Figure 3:
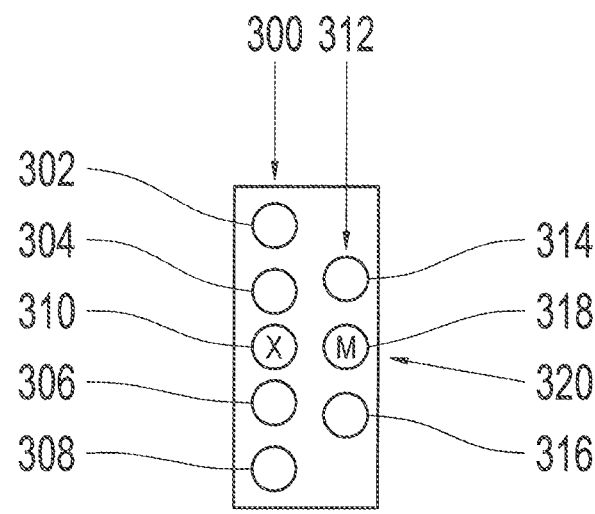
FIG. 3 shows a schematic illustration of various gearshift lever positions in a shifting device according to an exemplary embodiment of the present disclosure.

FIG. 3 shows a schematic illustration of various gearshift lever positions in a shifting device according to an exemplary embodiment of the present disclosure. The gearshift lever positions are divided into two groups: firstly, a main gate 300 having four main gate positions 302, 304, 306, 308 and a main gate middle position 310, and secondly, a secondary gate 312, in this case a manual gate, having two secondary gate positions 314, 316 and a secondary gate middle position 318. Additionally, the gearshift lever can be moved back and forth between the two middle positions 310, 318 via a changing gate 320.

By way of example, the secondary gate positions 314, 316 are used for a manual shifting of the vehicle transmission, and the main gate positions 302, 304, 306, 308 are used to select different automatic gear settings of the vehicle transmission, P, R, N or D, wherein the main gate middle position 310 can represent a stable position of the gearshift lever, and the secondary gate middle position 318 can represent a monostable position of the gearshift lever.

Figure 4:
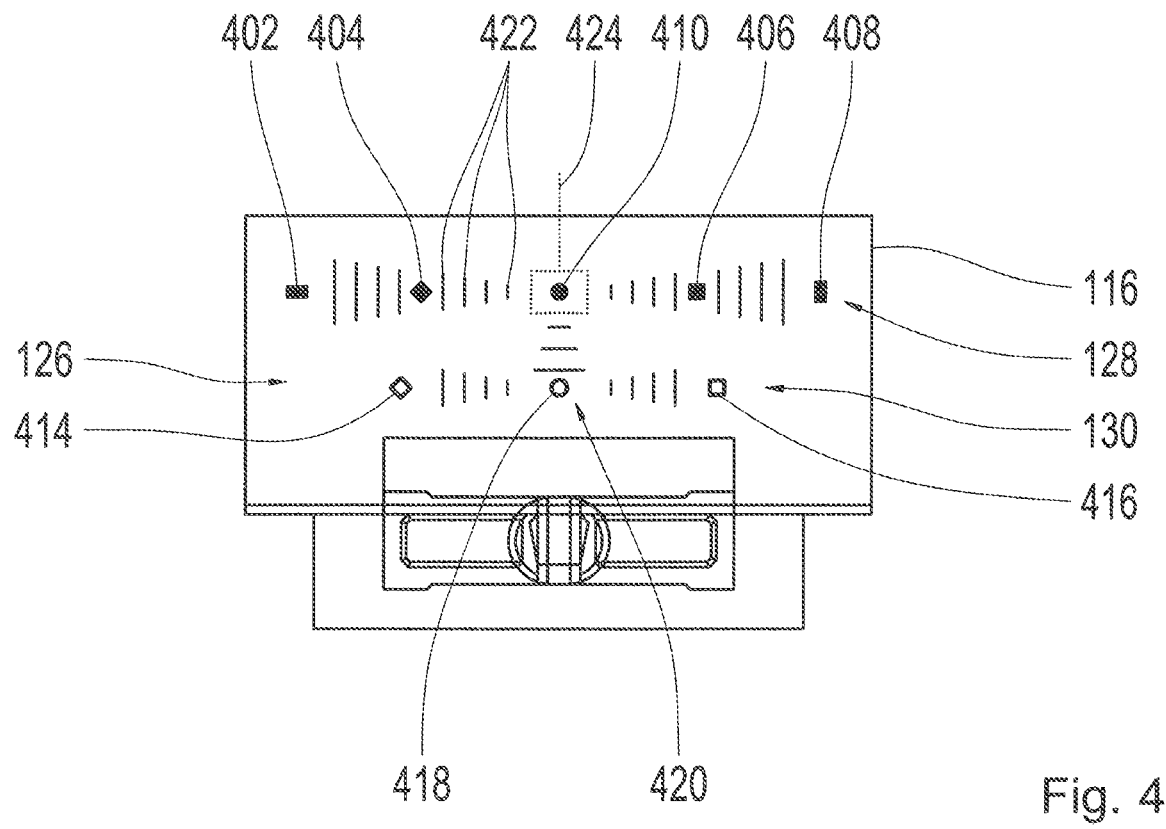
FIG. 4 shows a schematic illustration of a marking element according to an exemplary embodiment of the present disclosure.

FIG. 4 shows a schematic illustration of a marking element 116 according to an exemplary embodiment of the present disclosure. The marking element 116 is a marking element, for example, such as that described on the basis of the preceding figures. FIG. 4 shows a top view of the marking surface 126 of the marking element 116. The two marking lines 128, 130 are disposed substantially parallel to one another. By way of example, the first marking line 128 is dedicated to the main gate of the shifting device shown in FIG. 3, and the second marking line 130 is dedicated to the secondary gate of the shifting device shown in FIG. 3. The first marking line 128 comprises four main gate markings 402, 404, 406, 408, each of which is dedicated to one of the main gate positions, and a first middle position marking representing the main gate middle position. Accordingly, the second marking line 130 comprises two secondary gate markings 414, 416, each of which is dedicated to one of the secondary gate shifting positions, as well as a second middle position marking 418 corresponding to the secondary gate middle position.

According to this exemplary embodiment, the markings of the two marking lines 128, 130 are depicted as different geometrical shapes, i.e. a circle, square, or rectangle. By way of example, in FIG. 4 the secondary gate marking 414 has the shape of the main gate marking 402, the secondary gate marking 416 has the shape of the main gate marking 404, and the second middle position marking 418 has the shape of the first middle position marking 410. The secondary gate markings 414, 416 and the second middle position marking 418 are only depicted as an outline in each case, in contrast to the main gate markings 402, 404, 406, 408 and the first middle position marking 410, in order to form a contrast between the two marking lines 128, 130.

The two middle position markings 410, 418 also form the ends of a third marking line 420, which represents the changing gate described in reference to FIG. 3. The third marking line 420 is substantially perpendicular to the two marking lines 128, 130, such that an H-shaped configuration is obtained.

The three marking lines 128, 130, 420 each have numerous spacing lines 422 of different lengths, each of which is disposed between two markings of one of each of the marking lines at a uniform spacing to one another. By way of example, four spacing lines 422 are disposed between two markings in each case in FIG. 4, with the exception of the two middle position markings 410, 418, between which there are only three spacing lines 422. The spacing lines 422 run substantially transverse to a longitudinal axis of that marking line to which the belong, respectively.

A respective length of the spacing lines 422 on the first marking line 128 corresponds thereby to a respective spacing of this spacing line to the first middle position marking 410, and respective length of the spacing lines 422 on the second marking line 130 corresponds thereby to a respective spacing of this spacing line to the second middle position marking 418. In FIG. 4, the spacing lines 422 of the two marking lines 128, 130 become increasingly longer in both directions starting from a respective middle position marking. The spacing lines 422 of the third marking line 420 become increasingly longer starting from a middle position marking 410.

The markings and spacing lines of the three marking lines 128, 130, 420 can be detected at a detection position 424, at which the sensor electronics system located on the printed circuit board lie opposite the marking surface 126. The detection position 424 corresponds to the detection range described on the basis of FIG. 1. In FIG. 4, the marking element 116 is positioned in the guide assembly such that the first middle position marking 410 is located at the detection position 424. By way of example, the first middle position marking 410 is located thereby in the beam path of a light beam emitted by the sensor electronics system for scanning the marking surface 126.

Figure 5:
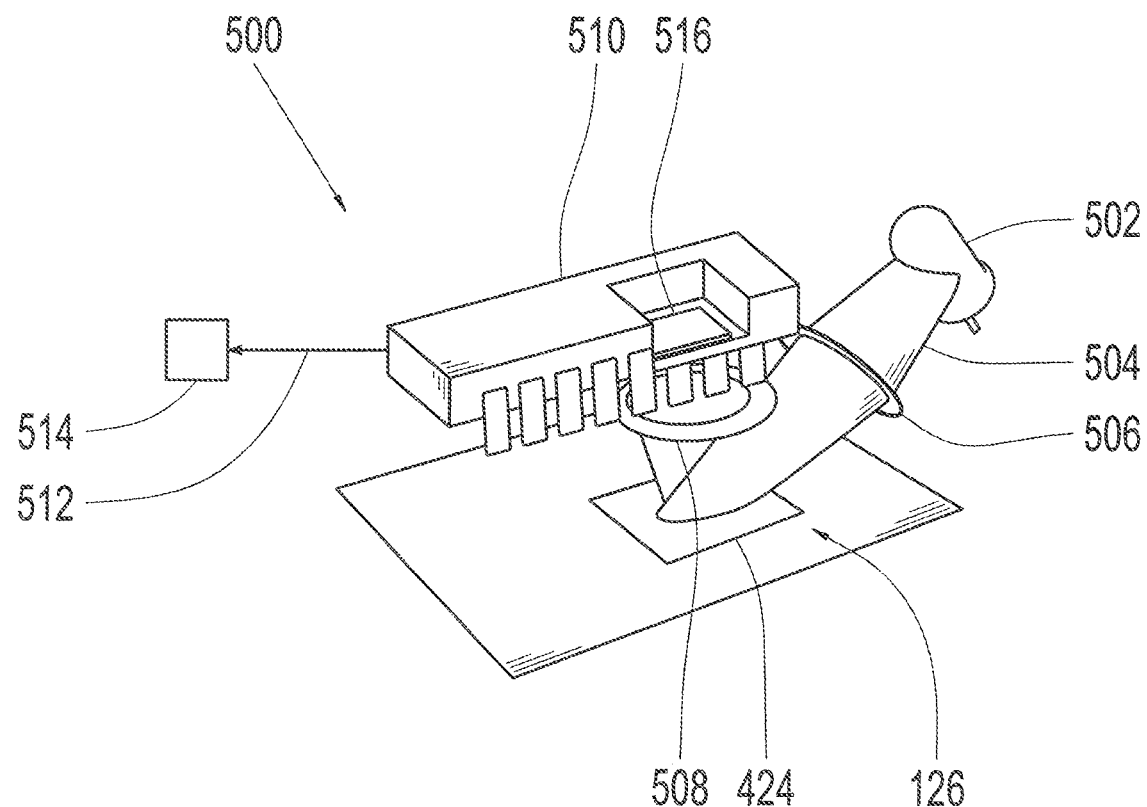
FIG. 5 shows a schematic illustration of a detection device according to an exemplary embodiment of the present disclosure.

FIG. 5 shows a schematic illustration of a detection device 500 according to an exemplary embodiment of the present disclosure. The detection device 500 is a sensor electronics system, for example, such as that described on the basis of FIGS. 1 to 4. The detection device 500 comprises a light source 502 for emitting a light beam 504, here an LED, an LED lens 506 for directing the light beam 504 toward the detection position 424 on the marking surface 126, and a sensor lens 508 disposed opposite the marking surface 126, for directing a light beam reflected at the detection position 424 into a sensor, which is configured to generate a movement signal 512 representing a movement of the marking surface 126 in relation to the detection position 424 by means of the reflected light beam, and to send this movement signal to an evaluation device 514. The evaluation device 514 is depicted schematically here, adjacent to the sensor 510. In reality, the evaluation device 514 can be implemented as a separate unit from the detection device 500, or a component of the detection device 500, i.e. the sensor 510. The evaluation device 500 is configured to determine a position of the gearshift lever in the shifting device by means of the movement signal 512.

According to one exemplary embodiment, the detection device 500 is a sensor system of a computer mouse, wherein the marking surface 126 functions basically as a mouse pad. Depending on the embodiment of the computer mouse sensor system, the light source 502 is either a light emitting diode or a laser diode. The light reflected by the marking surface 126 is focused by the sensor lens 508, and directed into a mini-camera 516 of the sensor 510. The mini-camera 516 is configured to transmit image data to the evaluation device 514 as a movement signal 512, a digital signal processor (DSP), which receives the image data in the form of a grayscale image. The evaluation device 514 converts the image data into speeds, and calculates movement data from the speeds in the form of $\Delta x$ and $\Delta y$ values, which represent a pathway traveled by the marking element along at least one detected marking line. A shifting position of the gearshift lever can then be determined on the basis of this pathway.

By way of example, the mini-camera 516 has a resolution of 16×16 to 30×30 pixels. The sensor can record and evaluate an average of 1500 images per second, for example.

Figure 6:
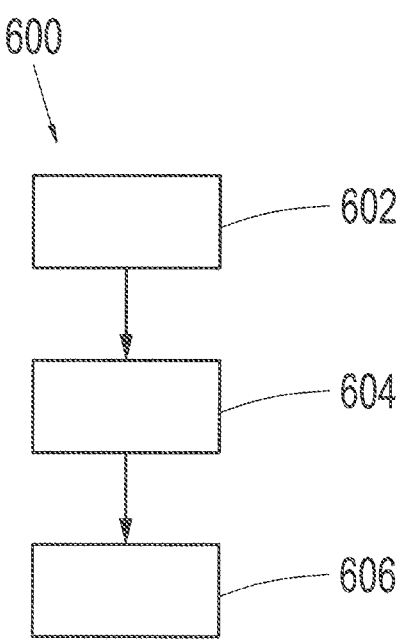
FIG. 6 shows a flow chart of a method for determining a gearshift lever position in a shifting device according to an exemplary embodiment of the present disclosure.

FIG. 6 shows a flow chart of a method 600 for determining a gearshift lever position in a shifting device according to an exemplary embodiment of the present disclosure. The method can be carried out, for example, using a shifting device, such as that described on the basis of FIGS. 1 to 5. Therein, the marking element is guided to the detection position by means of the guide assembly in a method step 602. More precisely, the marking element is guided to the detection position along the first marking line, when the gearshift lever is moved along a first shift gate of the shifting device represented by the first marking line, and guided to the detection position along the second marking line when the gearshift lever is moved along a second shift gate of the shifting device represented by the second marking line. In a further method step 604, a movement signal is created by means of the detection device, which represents a movement of the first marking line or a movement of the second marking line, or a movement of both the first marking line and the second marking line, in relation to the detection position. In an optional evaluation step 606, the movement signal can be evaluated in order to determine a position of the gearshift lever in the first shift gate or the second shift gate, by means of an evaluation device described above in reference to FIG. 5.

The exemplary embodiments described herein and illustrated in the Figures are selected only by way of example. Different exemplary embodiments can be combined with one another, either in their entirety, or with respect to individual features. Furthermore, one exemplary embodiment can be supplemented by features of another exemplary embodiment.

Furthermore, method steps according to the disclosure can be repeated, or executed in a sequence other than that described herein.

If an exemplary embodiment comprises an "and/or" conjunction between a first feature and a second feature, this can be read to mean that the exemplary embodiment according to one embodiment has both the first feature and the second feature, and according to another embodiment, has either just the first feature or just the second feature.

REFERENCE SIGNS 100 shifting device
102 housing base part 104 housing insert
106 crosspiece
108 crosspiece axis
110 crosspiece clearance
112 gearshift lever
114 gearshift lever axis
116 marking element
118 guide assembly
120 sliding axis
121 longitudinal axis
122 retention element
124 arm
126 marking surface
128 first marking line
130 second marking line
132 printed circuit board
133 cut-out
200 mounting bracket
202 finger
204 first guide track
206 second guide track
208 elongated hole
300 main gate
302 first main gate position
304 second main gate position
306 third main gate position
308 fourth main gate position
310 main gate middle position
312 secondary gate
314 first secondary gate position
316 second secondary gate position
318 secondary gate middle position
320 changing gate
402 first main gate marking
404 second main gate marking
406 third main gate marking
408 fourth main gate marking
410 first middle position marking
414 first secondary gate marking
416 second secondary gate marking
418 second middle position marking
420 third marking line
422 spacing lines
424 detection position
500 detection device
502 light source
504 light beam
506 LED lens
508 sensor lens
510 sensor
512 movement signal
514 evaluation device
516 mini-camera
600 method for determining a gearshift lever position
602 guiding to of the marking element
604 creation of a movement signal
606 evaluation of the movement signal

The invention claimed is:

1. A shifting device for a vehicle transmission, the shifting device comprising:
a gearshift lever for selecting a transmission setting, wherein the gearshift lever can move along a first shift gate and one second shift gate;
a marking element mechanically coupled to the gearshift lever, having a first marking line dedicated to the first shift gate and one second marking line dedicated to the second shift gate;
a guide assembly configured to guide the marking element to a detection position along the first marking line when the gearshift lever is moved along the first shift gate, and guide the marking element to the detection position along the second marking line when the gearshift lever is moved along the second shift gate; and
a detection device disposed at the detection position and configured to create a movement signal representing a movement of the first marking line or the second marking line in relation to the detection position in order to determine a position of the gearshift lever in the first shift gate or the second shift gate,
further comprising an evaluation device, which is configured to determine a speed of the movement of the first marking line or the second marking line on the basis of the movement signal, to determine a distance travelled on the first marking line or the second marking line as a function of the speed, and to determine the position of the gearshift lever in the first shift gate or the second shift gate as a function of the distance.

2. The shifting device according to claim 1, wherein the first marking line has numerous different markings for marking predetermined positions of the gearshift lever in the first shift gate, and the second marking line has numerous different markings for marking predetermined positions of the gearshift lever in the second shift gate, wherein the detection device is configured to create the movement signal on the basis of the markings on the first marking line, and on the basis of the markings on the second marking line.

3. The shifting device according to claim 2, wherein the first marking line has numerous spacing lines of different lengths for marking a respective spacing between the markings on the first marking line, and the second marking line has numerous spacing lines of different lengths for marking a respective spacing between the markings on the second marking line, wherein the detection device is configured to also create the movement signal on the basis of the spacing lines on the first marking line and the spacing lines on the second marking line.

4. The shifting device according to claim 3, wherein the first marking line has a first middle position marking for marking a middle position of the gearshift lever in the first shift gate, and the second marking line has a second middle position marking for marking a middle position of the gearshift lever in the second shift gate, wherein a respective length of the spacing lines on the first marking line represents a respective spacing of the spacing line to the first middle position marking and a respective length of the spacing lines on the second marking line represents a respective spacing of the spacing line to the second middle position marking.

5. The shifting device according to claim 1, wherein the gearshift lever is disposed such that it can move along a changing gate in order to change between the first shift gate and the second shift gate, wherein the marking element has a third middle position marking dedicated to the changing gate, wherein the guide assembly is configured to guide the marking element to the detection position along a third marking line when the gearshift lever is moved along the changing gate and wherein the detection device is configured to create a movement signal representing a movement of the third marking line in relation to the detection position in order to determine a position of the gearshift lever in the changing gate.

6. The shifting device according to claim 5, wherein the third marking line is substantially oriented perpendicular to the first marking line and to the second marking line.

7. The shifting device according to claim 5, wherein the third marking line is substantially oriented perpendicular to the first marking line or to the second marking line.

8. The shifting device according to claim 1, further comprising a housing base part, a housing insert disposed in the housing base part, and a crosspiece, which is pivotably disposed in the housing insert, in order to move the gearshift lever between the first shift gate and the second shift gate, wherein the gearshift lever is pivotably disposed in the crosspiece, in order to be moved along the first shift gate and the second shift gate, and wherein the crosspiece is mechanically coupled to the guide assembly, in order to change a position of the guide assembly in relation to the detection position when the gearshift lever is moved between the first shift gate and the second shift gate.

9. The shifting device according to claim 1, wherein a main plane of extension of the marking element is disposed substantially parallel to a longitudinal axis of the gearshift lever.

10. A system comprising a computer mouse sensor system as the detection device in a shifting device according to claim 1.

11. The shifting device according to claim 1, wherein the first marking line has numerous different markings for marking predetermined positions of the gearshift lever in the first shift gate, and the second marking line has numerous different markings for marking predetermined positions of the gearshift lever in the second shift gate, wherein the detection device is configured to create the movement signal on the basis of the markings on the first marking line, or on the basis of the markings on the second marking line.

12. The shifting device according to claim 11, wherein the first marking line has numerous spacing lines of different lengths for marking a respective spacing between the markings on the first marking line, and the second marking line has numerous spacing lines of different lengths for marking a respective spacing between the markings on the second marking line, wherein the detection device is configured to also create the movement signal on the basis of the spacing lines on the first marking line or the spacing lines on the second marking line.

13. The shifting device according to claim 12, wherein the first marking line has a first middle position marking for marking a middle position of the gearshift lever in the first shift gate, and the second marking line has a second middle position marking for marking a middle position of the gearshift lever in the second shift gate, wherein a respective length of the spacing lines on the first marking line represents a respective spacing of the spacing line to the first middle position marking, or a respective length of the spacing lines on the second marking line represents a respective spacing of the spacing line to the second middle position marking.

14. The shifting device according to claim 1, further comprising a housing base part, a housing insert disposed in the housing base part, and a crosspiece, which is pivotably disposed in the housing insert, in order to move the gearshift lever between the first shift gate and the second shift gate, wherein the gearshift lever is pivotably disposed in the crosspiece, in order to be moved along the first shift gate or the second shift gate, and wherein the crosspiece is mechanically coupled to the guide assembly, in order to change a position of the guide assembly in relation to the detection position when the gearshift lever is moved between the first shift gate and the second shift gate.

15. A shifting device for a vehicle transmission, the shifting device comprising:

a gearshift lever for selecting a transmission setting, wherein the gearshift lever can move along a first shift gate and one second shift gate;

a marking element mechanically coupled to the gearshift lever, having a first marking line dedicated to the first shift gate and one second marking line dedicated to the second shift gate;

a guide assembly configured to guide the marking element to a detection position along the first marking line when the gearshift lever is moved along the first shift gate, and guide the marking element to the detection position along the second marking line when the gearshift lever is moved along the second shift gate; and a detection device disposed at the detection position and configured to create a movement signal representing a movement of the first marking line or the second marking line in relation to the detection position in order to determine a position of the gearshift lever in the first shift gate or the second shift gate, wherein the first marking line has numerous different markings for marking predetermined positions of the gearshift lever in the first shift gate, and the second marking line has numerous different markings for marking predetermined positions of the gearshift lever in the second shift gate, wherein the detection device is configured to create the movement signal on the basis of the markings on the first marking line, and on the basis of the markings on the second marking line, wherein the first marking line has numerous spacing lines of different lengths for marking a respective spacing between the markings on the first marking line, and the second marking line has numerous spacing lines of different lengths for marking a respective spacing between the markings on the second marking line, wherein the detection device is configured to also create the movement signal on the basis of the spacing lines on the first marking line and the spacing lines on the second marking line.

16. The shifting device according to claim 15, wherein the first marking line has a first middle position marking for marking a middle position of the gearshift lever in the first shift gate, and the second marking line has a second middle position marking for marking a middle position of the gearshift lever in the second shift gate, wherein a respective length of the spacing lines on the first marking line represents a respective spacing of the spacing line to the first middle position marking and a respective length of the spacing lines on the second marking line represents a respective spacing of the spacing line to the second middle position marking.

17. A shifting device for a vehicle transmission, the shifting device comprising:

a gearshift lever for selecting a transmission setting, wherein the gearshift lever can move along a first shift gate and one second shift gate;

a marking element mechanically coupled to the gearshift lever, having a first marking line dedicated to the first shift gate and one second marking line dedicated to the second shift gate;

a guide assembly configured to guide the marking element to a detection position along the first marking line when the gearshift lever is moved along the first shift gate, and guide the marking element to the detection position along the second marking line when the gearshift lever is moved along the second shift gate; and a detection device disposed at the detection position and configured to create a movement signal representing a movement of the first marking line or the second marking line in relation to the detection position in order to determine a position of the gearshift lever in the first shift gate or the second shift gate, wherein the gearshift lever is disposed such that it can move along a changing gate in order to change between the first shift gate and the second shift gate, wherein the marking element has a third middle position marking dedicated to the changing gate, wherein the guide assembly is configured to guide the marking element to the detection position along a third marking line when the gearshift lever is moved along the changing gate and wherein the detection device is configured to create a movement signal representing a movement of the third marking line in relation to the detection position in order to determine a position of the gearshift lever in the changing gate.

18. The shifting device according to claim 17, wherein the third marking line is substantially oriented perpendicular to the first marking line and to the second marking line.

19. The shifting device of claim 17, wherein the third marking line is substantially oriented perpendicular to the first marking line or to the second marking line.

20. A shifting device for a vehicle transmission, the shifting device comprising:
- a gearshift lever for selecting a transmission setting, wherein the gearshift lever can move along a first shift gate and one second shift gate;
- a marking element mechanically coupled to the gearshift lever, having a first marking line dedicated to the first shift gate and one second marking line dedicated to the second shift gate;
- a guide assembly configured to guide the marking element to a detection position along the first marking line when the gearshift lever is moved along the first shift gate, and guide the marking element to the detection position along the second marking line when the gearshift lever is moved along the second shift gate; and
- a detection device disposed at the detection position and configured to create a movement signal representing a movement of the first marking line or the second marking line in relation to the detection position in order to determine a position of the gearshift lever in the first shift gate or the second shift gate, wherein the first marking line has numerous different markings for marking predetermined positions of the gearshift lever in the first shift gate, and the second marking line has numerous different markings for marking predetermined positions of the gearshift lever in the second shift gate, wherein the detection device is configured to create the movement signal on the basis of the markings on the first marking line, or on the basis of the markings on the second marking line, and wherein the first marking line has numerous spacing lines of different lengths for marking a respective spacing between the markings on the first marking line, and the second marking line has numerous spacing lines of different lengths for marking a respective spacing between the markings on the second marking line, wherein the detection device is configured to also create the movement signal on the basis of the spacing lines on the first marking line or the spacing lines on the second marking line.

21. The shifting device according to claim 20, wherein the first marking line has a first middle position marking for marking a middle position of the gearshift lever in the first shift gate, and the second marking line has a second middle position marking for marking a middle position of the gearshift lever in the second shift gate, wherein a respective length of the spacing lines on the first marking line represents a respective spacing of the spacing line to the first middle position marking, or a respective length of the spacing lines on the second marking line represents a respective spacing of the spacing line to the second middle position marking.

* * * * *